United States Patent [19]
Sunder

[11] Patent Number: 5,901,575
[45] Date of Patent: May 11, 1999

[54] STACKABLE STRUCTURED PACKING WITH CONTROLLED SYMMETRY

[75] Inventor: Swaminathan Sunder, Allentown, Pa.

[73] Assignee: Air Products and Chemicals, Inc., Allentown, Pa.

[21] Appl. No.: 08/918,175

[22] Filed: Aug. 25, 1997

[51] Int. Cl.⁶ .................................................... F25J 1/00
[52] U.S. Cl. .............................. 62/643; 62/906; 165/166; 202/158; 261/DIG. 72
[58] Field of Search ............. 62/643, 906; 261/DIG. 72; 202/158; 165/166

[56] References Cited

U.S. PATENT DOCUMENTS

| | | | |
|---|---|---|---|
| 4,296,050 | 10/1981 | Meier | 261/112 |
| 4,830,792 | 5/1989 | Wilhelm | 261/79.2 |
| 5,100,448 | 3/1992 | Lockett et al. | 62/906 |
| 5,158,712 | 10/1992 | Wilhelm | 261/79.2 |
| 5,500,160 | 3/1996 | Suess | 261/79.2 |
| 5,730,000 | 3/1998 | Sunder et al. | 62/643 |

*Primary Examiner*—Ronald Capossela
*Attorney, Agent, or Firm*—Willard Jones, II

[57] ABSTRACT

A structured packing is disclosed. The structured packing has a plurality of packing elements stacked together as "building blocks" to provide the packing for an exchange column. Each packing element comprises a polyhedron (e.g., a cube) having a plurality of edges formed by elongated rods. At least one transfer sheet is disposed within the polyhedron (e.g., a cube), wherein the first end of each transfer sheet connects to a different edge of the polyhedron and the second end of each transfer sheet connects to another edge of the polyhedron. In one embodiment, the intersection of the transfer sheets forms two pyramids within the cube-shaped packing element, the bases of the pyramids being opposite sides of the cube and the apices of the pyramids intersecting substantially at the center of the cube. In the preferred embodiment, at least one side of each pyramid is open and the other sides of the pyramids formed by the intersecting transfer sheets provide flow surfaces within the packing element. The elements allow great flexibility in the manner and relative orientations in which the elements can be packed together, allowing great design freedom to manufacturers and users of exchange columns.

85 Claims, 3 Drawing Sheets

STACKABLE STRUCTURED PACKING WITH CONTROLLED SYMMETRY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to structured packing. The structured packing has particular application in exchange columns, especially in cryogenic air separation processes, although it also may be used in other applications, such as heat exchangers.

The term, "column", as used herein, means a distillation or fractionation column or zone, i.e., a column or zone wherein liquid and vapor phases are countercurrently contacted to effect separation of a fluid mixture, such as by contacting of the vapor and liquid phases on packing elements or on a series of vertically-spaced trays or plates mounted within the column.

The term "packing" means solid or hollow bodies of predetermined size, shape, and configuration used as column internals to provide surface area for the liquid to allow mass transfer at the liquid-vapor interface during countercurrent flow of two phases. Two broad classes of packings are "random" and "structured".

"Random packing" means packing wherein individual members do not have any particular orientation relative to each other or to the column axis. Random packings are small, hollow structures with large surface area per unit volume that are loaded at random into a column.

"Structured packing" means packing wherein individual members have specific orientation relative to each other and to the column axis. Structured packings usually are made of expanded metal or woven wire screen stacked in layers or as spiral windings.

In processes such as distillation or direct contact cooling, it is advantageous to use structured packing to promote heat and mass transfer between counterflowing liquid and vapor streams. Structured packing, when compared with random packing or trays, offers the benefits of higher efficiency for heat and mass transfer with lower pressure drop. It also has more predictable performance than random packing.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen). Various packings or trays may be used to bring the liquid and gaseous phases of the mixture into contact to accomplish mass transfer between the phases.

Figure 1:
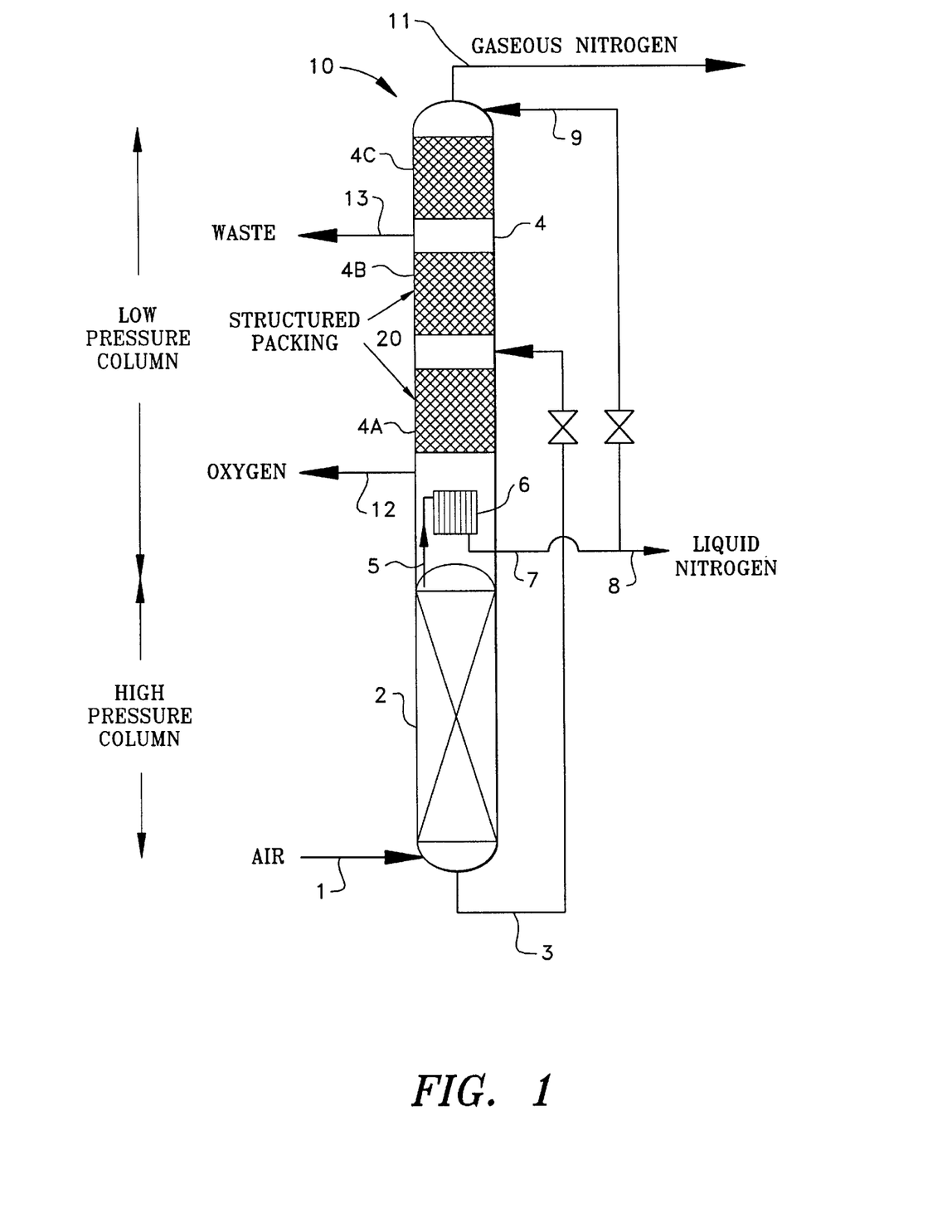
FIG. 1 is a schematic elevation of an air separation unit.
Figure 2A:
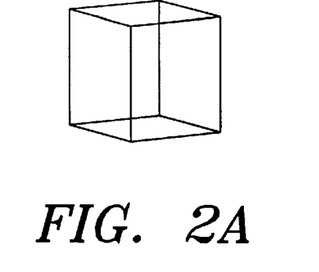
FIGS. 2A–2G illustrate some polyhedrons, the shapes of which may be taken by some of the packing elements of the present invention.
Figure 2B:
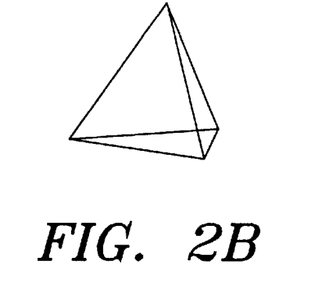
Figure 2C:
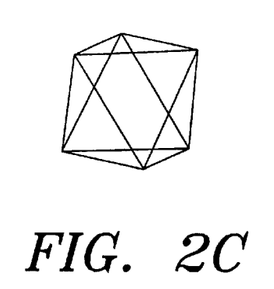
Figure 2D:
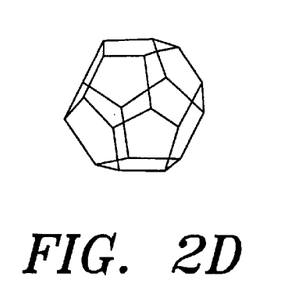
Figure 2E:
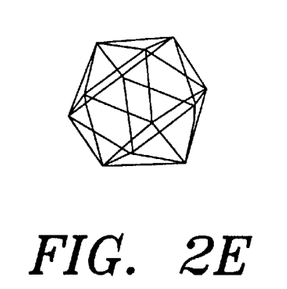
Figure 2F:
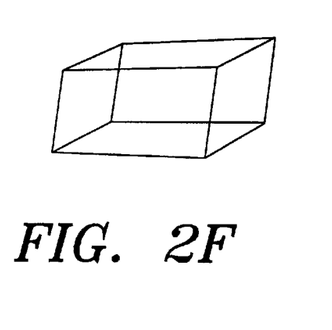
Figure 2G:
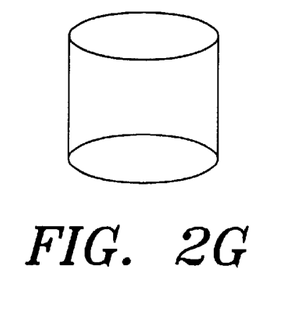

There are many processes for the separation of air by cryogenic distillation into its components (i.e., nitrogen, oxygen, argon, etc.). A typical cryogenic air separation unit 10 is shown schematically in FIG. 1. High pressure feed air 1 is fed into the base of a high pressure distillation column 2. Within the high pressure column 2, the air is separated into nitrogen-enriched vapor and oxygen-enriched liquid. The oxygen-enriched liquid 3 is fed from the high pressure distillation column 2 into a low pressure distillation column 4. Nitrogen-enriched vapor 5 is passed into a condenser 6 where it is condensed to provide reboil to the low pressure column 4. The nitrogen-enriched liquid 7 is partly tapped 8 and is partly fed 9 into the low pressure column 4 as liquid reflux. In the low pressure column 4, the feeds (3,9) are separated by cryogenic distillation into oxygen-rich and nitrogen-rich components. Structured packing 20 may be used to bring into contact the liquid and gaseous phases of the oxygen and nitrogen to be separated. The nitrogen-rich component is removed as a vapor 11. The oxygen-rich component is removed as a vapor 12. Alternatively, the oxygen-rich component can be removed from a location in the sump surrounding reboiler/condenser 6 as a liquid. A waste stream 13 also is removed from the low pressure distillation column 4. The low pressure distillation column 4 can be divided into multiple sections. Three such sections (4A, 4B, 4C) are shown in FIG. 1 by way of example.

The most commonly used structured packing consists of corrugated sheets of metal or plastic foils or corrugated mesh cloths stacked vertically. These foils may have various forms of apertures and/or surface roughening features aimed at improving the heat and mass transfer efficiency. However, the flow of both liquid and vapor is largely confined to the space between the sheets. Such packing lacks symmetry and thus the flow characteristics are highly non-isotropic. Liquid and vapor introduced between a pair of sheets tend to stay confined between that pair of sheets. A solution to this is to rotate successive layers of the structured packing sheets, typically by an angle of 90°. An example of such packing is disclosed in U.S. Pat. No. 4,296,050 (Meier). However, each rotation increases the pressure drop through the column comprised of the packing.

Attempts have been made in the past to produce a packing which leads to more isotropic fluid flow through a column including such packing.

For example, U.S. Pat. No. 4,830,792 (Wilhelm) discloses the use of horizontally superposed layers of packing, each of which is provided with adjacent pyramidal formations. Alternating fan-blade like structures are thereby formed which impart a vortex motion to ascending vapor in both clockwise and anti-clockwise directions. U.S. Pat. No. 5,158,712 (Wilhelm) and U.S. Pat. No. 5,500,160 (Suess) disclose similar layers of packing. However, since these prior art layers of packing are limited in the way that they can be stacked, the configurations and symmetry which can be provided by stacking these prior art layers of packing are limited.

It also is well-known in the prior art that mesh type packing helps spread liquid efficiently and gives good mass transfer performance, but mesh type packing is much more expensive than most foil type packing.

It is desired to have a specific structured packing that shows high performance characteristics for cryogenic applications, such as those used in air separation, and for other heat and mass transfer applications.

BRIEF SUMMARY OF THE INVENTION

The present invention is a structured packing having a plurality of packing elements stacked together as "building blocks" to provide the packing for an exchange column. Each packing element comprises a polyhedron having a plurality of edges formed by elongated rods and at least one transfer sheet disposed within the polyhedron. The first end of each transfer sheet connects to a different edge of the polyhedron and the second end of each transfer sheet connects to another edge of the polyhedron. In one embodiment, at least some of the transfer sheets intersect. The transfer sheets provide flow surfaces within the packing elements.

The packing elements, which are assembled in the manner of building blocks to provide the structured packing, may be in the shape of any one of many polyhedrons, some of which are illustrated in FIGS. 2A to 2G. Such polyhedrons include, but are not limited to, cubes, parallelepipeds, cylinders, pyramids, and other forms bounded by plane polygons.

However, in the preferred embodiment of the invention, the packing element is in the shape of a cube. The cube has a center and twelve (12) edges comprising twelve (12) elongated rods of equal length. At least one transfer sheet is disposed within the cube. The first end of each transfer sheet connects to a different edge of the cube and the second edge of each transfer sheet connects to a diagonally opposite edge of the cube.

In one variation of the preferred embodiment, the transfer sheets intersect substantially at the center of the cube, and each transfer sheet is progressively narrower in width toward the center of the cube. Each transfer sheet has a shape comprising two isosceles triangles. Each such triangle has a base and an apex, and the apices of the triangles intersect substantially at the center of the cube, and the bases of the triangles are diagonally opposite edges of the cube.

The intersection of the transfer sheets forms two pyramids, each pyramid having a square base and a plurality of sides which meet at an apex of the pyramid. The bases of the pyramids are opposite sides of the cubes, and the apices of the pyramids intersect substantially at the center of the cube.

In the preferred embodiment, at least one side of each pyramid is open and the other sides of the pyramids are formed by the intersecting transfer sheets, which provide flow surfaces within the packing element.

In another embodiment, at least one transfer sheet has a surface texture on its surface. The surface texture may comprise a plurality of bands of fluting in the form of fine grooves which form alternating peaks and troughs across the surface of the transfer sheet. Some or all of the transfer sheets also may be provided with a plurality of apertures or holes in an array across the transfer sheet.

The rods used to form the edges of each packing element are substantially linear in the preferred embodiment. In an alternative embodiment, the rods are undulating in a wave-like manner. The rods may be substantially smooth or may have a textured surface.

Connecting means may be provided for connecting adjacent packing elements. The connecting means may comprise at least one peg adjacent to at least one edge of the cube (or polyhedron) of the packing element. At least one aperture adjacent to an edge of the cube (or polyhedron) of an adjacent packing element is sized to receive the peg.

The connecting means also may comprise at least one clip for clipping together adjacent packing elements.

Another aspect of the present invention is an exchange column for exchanging heat and/or mass between a first phase and a second phase, the exchange column having at least one structured packing assembled from packing elements according to the present invention.

In another aspect of the present invention there is provided a process for cryogenic air separation comprising contacting vapor and liquid countercurrently in at least one distillation column containing at least one mass transfer zone wherein liquid-vapor contact is established by at least one structured packing assembled from packing elements as described above. Layers of adjacent elements may be stacked one on top of the other and adjacent each other.

In yet another aspect of the present invention, there is provided an exchange column for exchanging mass and/or heat between two liquids, comprising contacting said liquids in at least one exchange column wherein liquid-liquid contact is established by at least one structured packing as described above. Layers of adjacent elements may be packed as described above.

In yet another aspect of the present invention, there is provided an exchange column for exchanging heat and/or mass between a first fluid and a second fluid, the exchange column comprising a plurality of substantially identical packing elements packed in layers of adjacent elements, each element containing at least one inclined flow surface over which two fluids may flow countercurrently to each other and an open portion through which fluid may flow, the elements being stackable such that the relative orientation of adjacent elements within a layer and between adjacent layers is freely determinable.

The present invention provides packing elements which are very easily packed together to form an exchange column. The elements can be mass-produced. The symmetry provided by plural packing elements stacked together in a column can be readily determined and controlled, on a small scale, by the manner in which adjacent elements are oriented with respect to each other, both within a layer of such elements in an exchange column and between respective layers of such elements in an exchange column. There is great flexibility in the manner and relative orientations in which the elements can be packed together, allowing great design freedom to manufacturers and users of exchange columns. An exchange column structure having improved fluid spreading properties with free flow of fluid in both orthogonal directions across the plane of the column can be provided. The elements can have high mechanical strength, and can be in the form of "building blocks" which are readily and simply stacked together.

BRIEF DESCRIPTION OF SEVERAL VIEWS OF THE DRAWINGS

Embodiments of the invention will now be described by way of example with reference to the accompanying drawings, in which:

FIG. 5 is a plan view and

DETAILED DESCRIPTION OF THE INVENTION

The present invention relates to a structured packing having a plurality of packing elements stacked together. The discrete packing elements, which are stacked like "building blocks", may be in the shape of any one of many polyhedrons, some of which are illustrated in FIGS. 2A to 2G.

Figure 3:
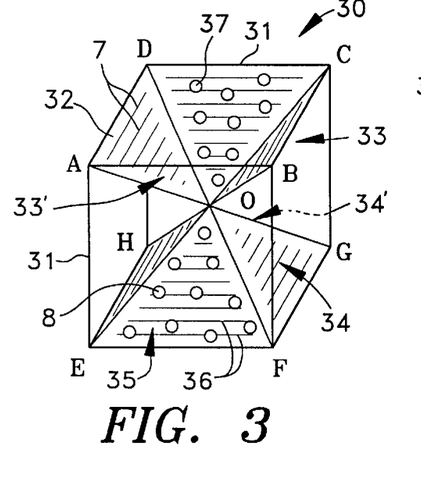
FIG. 3 is a perspective view of a first example of a packing element.

In FIG. 3, there is shown an example of a structured packing element 30 in the form of a cube. The cubic packing element 30 has eight (8) vertices labeled A to H. The center of the cubic element 30 is indicated by O. The edges of the cubic element 30 are formed by smooth straight rods 31 in the example shown in FIG. 3. Each rod 31 joins a respective pair of adjacent vertices, for example AB, BC, CD, DA. The structured packing element 30 therefore has a cage-like outer structure. The rods 31 may be made of any suitable material, such as a metal (e.g., aluminum) or plastics.

Plural transfer sheets 32 are provided for connecting pairs of vertices A to H with other pairs of vertices A to H. In the example shown in FIG. 3, there are three transfer sheets 32 which provide flow surfaces within the packing element 30. Each transfer sheet 32 is used to connect one adjacent pair of vertices (e.g., the vertices A and D) with the diagonally opposite pair of adjacent vertices (F and G) and to connect an edge (e.g., the edge AD) with the diagonally opposite edge (FG) of the cubic element 30. It will be seen that the transfer sheets 32 intersect at the center O of the cubic element 30 and that the planes of the transfer sheets 32 are at an angle of 45° to the sides of the cubic element 30.

In the example shown in FIG. 3, each of the transfer sheets 32 has an "hour-glass" shape comprising two isosceles triangles. Each transfer sheet 32 progressively narrows in width towards the center O of the cubic element 30. Thus, the respective transfer sheets 32 intersect almost at a point at the center O of the cubic element 30. As envisioned, the present invention does require that the transfer sheets intersect at the center of the cubic element. Alternatively, these transfer sheets can nearly intersect, i.e., be separated from each other by some small and definite distance. Such a distance would be effective in increasing the mechanical integrity. The intersecting transfer sheets 32 form respective square-based pyramidal structures 33,34 the apices of which meet at the center O of the cubic element 30 and the bases of which are coplanar with opposite sides ABCD, EFGH of the cubic element 30.

In a polyhedral packing element 30 having eight (8) vertices and six (6) sides [such as a cube (shown in FIG. 2A) or a parallelepiped (shown in FIG. 2F), or any other polyhedron having opposed ends with four vertices each], where the transfer sheets 32 are used to connect diagonally opposite edges of the element 30, a maximum of four such transfer sheets 32 may be used. While any number from one to four transfer sheets 32 may be used in such an element 30, it is most preferred that the pyramidal structures 33,34 have an open portion through which fluid may flow. In the example shown in FIG. 3, three transfer sheets 32 are in such an element 30. In this manner, each of the pyramidal structures 33,34 provided by the transfer sheets 32 has an open face 33c,34c through which a fluid may pass. Whatever topography is used for the packing element 30, it is preferred to leave an open path for fluid flow through the structure formed in the center of the element 30 by the transfer sheets 32.

Some or all of the transfer sheets 32 are preferably provided with a surface texture which improves the performance of the element 30 in enhancing mass and/or heat transfer between fluid streams passing over the transfer sheet 32. In particular, the transfer sheets 32 have parallel and regularly spaced bands 35 of what is termed "fluting" herein.

The fluting 35 is formed by relatively fine grooves 36 or corrugation or striation of the surface of the transfer sheets 32 in a manner which in itself is known, e.g. by molding, stamping or rolling with a suitable die. The bands of fluting 35 need not be strictly parallel nor evenly spaced. Other suitable texturing of the surfaces of the transfer sheets 32 will be apparent to persons skilled in the art.

Some or all of the transfer sheets 32 also preferably are provided with a plurality of apertures or through holes 37 in an array across the transfer sheet 32, as shown for one of the transfer sheets 32 in FIG. 3. The apertures or through holes 37 may be in a regular array or may be distributed randomly across the transfer sheet 32.

The bands of fluting 35 and the through holes 37 each promote efficient mass and/or heat transfer between the streams of fluids passing through a mass or heat exchange column constructed from such packing elements 30.

In an example, the cubic packing element 30 has a side of length 8.5 mm and may provide a surface area to volume ratio of 500 $m^2/m^3$. This is a high surface area to volume ratio, which is indicative of the highly efficient properties achieved with a packing element 30 according to the present invention.

Figure 4:
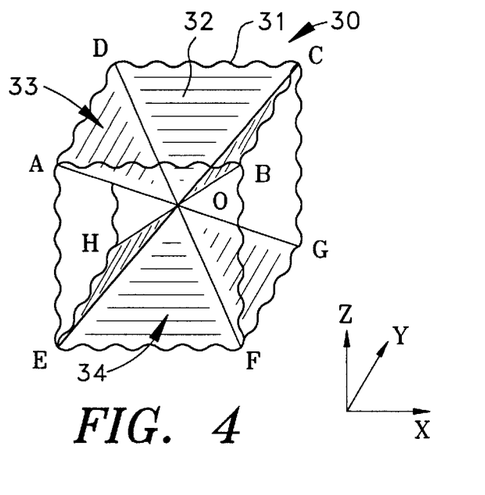
FIG. 4 is a perspective view of a second example of a packing element.

In FIG. 4, a variant of the packing element 30 of FIG. 3 is shown. In the example in FIG. 4, the connecting rods 31 are not linear, but undulate in a wave-like manner between the respective pairs of vertices. The rods 31 may additionally or alternatively have a surface texture. By providing rods 31 which are undulating and/or which have a textured surface, spreading and draining of liquid passing through the packing element 30 is promoted.

The packing elements 30 are stacked together to form a column of packing elements 30 for use in an exchange column, such as an air separation column. There are several packing elements 30 in a horizontal layer and many layers are stacked one on top of the other in the column. It may be advantageous to rotate each element 30 relative to adjacent elements 30, whether within a layer or between layers. For example, moving along a vertical axis (indicated by Z in the drawings), each element 30 may be rotated about the vertical axis by 90° relative to the element 30 below or above. In some circumstances, it may be desirable for the rotation to be in the same direction (i.e. clockwise or anti-clockwise) when moving in one direction (for example, vertically upwards) or it may be desirable to alternate the rotations to be alternately clockwise and anti-clockwise for adjacent blocks moving vertically upwards. Other permutations of rotations are possible and may be chosen according to the performance required. In an exchange column in which there is countercurrent flow of fluids through the column, it is preferable for all of the transfer sheets 32 to be at an angle of 45° to the vertical.

Figure 5:
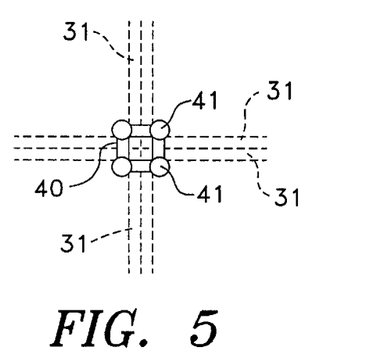
Figure 6:
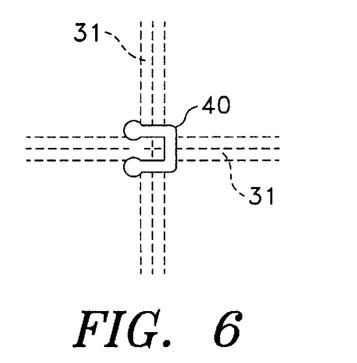
FIG. 6 is an elevation of a clip for connecting adjacent packing elements together.

In an exchange column, the packing elements 30 can simply be stacked one on top of the other and adjacent each other. In some circumstances, however, it is desirable to link the adjacent packing elements 30 together, to ease handling of the stacked elements 30. An example of this is shown in FIGS. 5 and 6. A clip 40 having four prongs 41 can be used to clip eight (8) adjacent packing elements 30 together at the adjoining vertices of those packing elements 30. The transfer sheets 32 may have small through holes (apertures) adjacent the vertices of the packing element 30 through which the prongs 41 of the clips 40 can pass to enable the packing elements 30 to be connected together.

Figure 7:
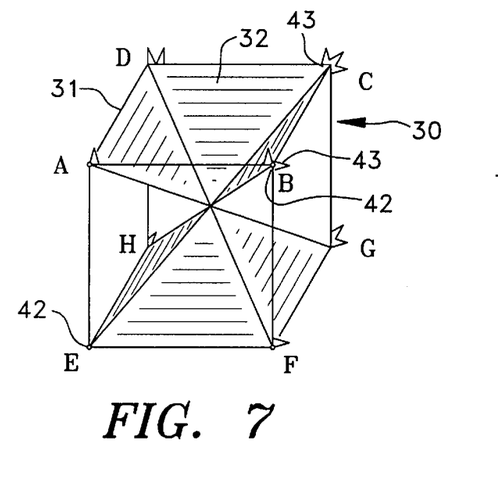
FIG. 7 is a perspective view of an example of a packing element having connecting means; and, FIG. 8 is a detailed view of the connecting means of the element of FIG. 7.
Figure 8:
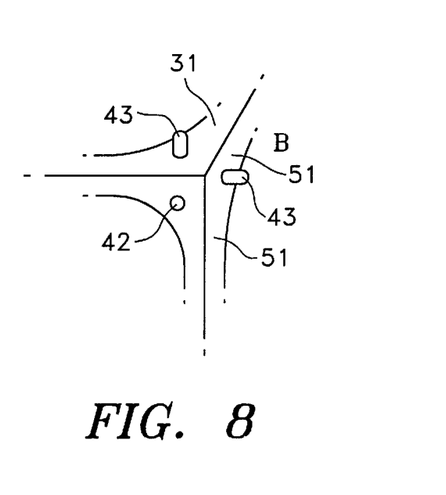

Another example of connecting means for connecting adjacent elements 30 is shown in FIGS. 7 and 8. In this example, each of the vertices A to H of the packing element 30 is provided with at least one socket 42 or one peg 43. The rods 31 may be flared towards the vertex as indicated at 51 in order to provide a strong base for the pegs 43 and provide sufficient support for the sockets 42. Each of the pegs 43 projects out of the cubic packing element 30 in a direction parallel to an edge of the cubic packing element 30. The presence of and number of pegs 43 and sockets 42 provided at each vertex A to H is such as to allow a peg 43 on a particular element 30 to engage with a socket 42 on an adjacent element 30 and vice versa when the elements 30 are stacked together.

The present invention has many advantages over the sheet-like packing elements of the prior art. The packing elements 30 are simply assembled in the manner of building blocks to provide the packing for an exchange column. The symmetry from one packing element to another can be controlled and varied on a small scale. Very isotropic flow can be achieved through an exchange column composed of the packing elements 30, with very efficient mixing of the fluids passing through the column. A great variety of topographies can be obtained by arranging the packing elements 30 in different ways, whether within a particular layer used in an exchange column (i.e., lateral variations) or in terms of the relative orientation of adjacent elements 30 in a vertical direction. The size of the packing elements 30 can be varied according to need. It may be advantageous in some circumstances to use packing elements 30 which have different sizes, topographies or different arrangements of transfer sheets 32 within a single exchange column. The packing elements 30 have high mechanical strength. The rods 31 can bear practically all of the load of the elements 30 stacked above, which means that the transfer sheets 32 can be very thin. This promotes efficient heat and/or mass transfer while also representing a saving in materials and weight. The transfer sheets 32 can be connected along the whole of the base of the triangular shape to a respective rod 31, again increasing the mechanical strength of the transfer sheets 32. Individual packing elements 30 can be mass produced and assembled.

The transfer sheets 32 may be made in any number of ways. By way of example, the whole pyramidal formation consisting of the two open pyramids 33,34 shown by way of example in FIG. 3 may be a single pressing, molding, casting or other forming operation. Alternatively, each pyramidal formation 33,34 may be single or multiple integral moldings and these molded pyramidal formations 33,34 may be joined at their apices during assembly of the element 30.

An embodiment of the present invention has been described with particular reference to the examples illustrated. However, it will be appreciated that variations and modifications may be made to the examples described within the scope of the appended claims.

I claim:

1. A structured packing having a plurality of packing elements stacked together, wherein each packing element comprises:
   a polyhedron having a plurality of edges formed by elongated rods; and
   at least one transfer sheet disposed within the polyhedron and having first and second ends, wherein the first end of each transfer sheet connects to a different edge of the polyhedron and the second end of each transfer sheet connects to another edge of the polyhedron.

2. A structured packing as in claim 1, wherein one side of each pyramid is open and the other sides of the pyramids are formed by the intersecting transfer sheets.

3. A structured packing as in claim 1 wherein the polyhedron is a cylinder.

4. A structured packing as in claim 1 wherein the polyhedron is a parallelepiped.

5. A structured packing as in claim 1 wherein the at least one transfer sheet has a surface texture on its surface.

6. A structured packing as in claim 5 wherein the surface texture comprises a plurality of bands of fluting in the form of fine grooves which form alternating peaks and troughs across the surface of at least one transfer sheet.

7. A structured packing as in claim 6 further including a plurality of apertures in the at least one transfer sheet.

8. A structured packing as in claim 1 wherein the rods are substantially linear.

9. A structured packing as in claim 1 wherein the rods are undulating.

10. A structured packing as in claim 1 wherein the rods have a textured surface.

11. A structured packing as in claim 1 further comprising connecting means for connecting adjacent packing elements.

12. A structured packing as in claim 1 wherein the connecting means comprises:
    at least one peg adjacent to at least one edge of a polyhedron of a packing element; and
    at least one aperture adjacent to at least one edge of a polyhedron of an adjacent packing element, said at least one aperture being sized to receive the at least one peg.

13. A structured packing as in claim 1 wherein the connecting means further comprises at least one clip for clipping together adjacent packing elements.

14. A structured packing having a plurality of packing elements stacked together, wherein each packing element comprises:
    a polyhedron having a plurality of edges formed by elongated rods; and
    a plurality of transfer sheets disposed with the polyhedron and having first and second ends, wherein the first end of each transfer sheet connects to a different edge of the polyhedron and the second end of each transfer sheet connects to another edge of the polyhedron.

15. A structured packing as in claim 14 wherein at least some of the transfer sheets intersect.

16. A structured packing having a plurality of packing elements stacked together, wherein each packing element comprises:
    a cube having a center and twelve edges comprising twelve elongated rods of equal length; and
    at least one transfer sheet disposed within the cube and having first and second ends, wherein the first end of each transfer sheet connects to a different edge of the cube and the second end of each transfer sheet connects to a diagonally opposite edge of the cube.

17. A structured packing as in claim 16, wherein each of the at least one transfer sheets is narrower in width toward the center of the cube.

18. A structured packing having a plurality of packing elements stacked together, wherein each packing element comprises:
    a cube having a center and twelve edges formed by twelve elongated rods of equal length; and
    a plurality of transfer sheets disposed within the cube, each transfer sheet having first and second ends, wherein the first end of each transfer sheet connects to a different edge of the cube and the second end of each transfer sheet connects to a diagonally opposite edge of the cube.

19. A structured packing as in claim 18, wherein the transfer sheets intersect substantially at the center of the cube and each transfer sheet is progressively narrower in width toward the center of the cube.

20. A structured packing as in claim 19, wherein each transfer sheet has a shape comprising two isosceles triangles, each triangle having a base and an apex, and the apices of the triangles intersect substantially at the center of the cube, and the bases of the triangles are diagonally opposite edges of the cube.

21. A structured packing as in claim 20, wherein the intersection of the transfer sheets forms two pyramids, each pyramid having a square base and a plurality of sides which meet at an apex of the pyramid, the bases of the pyramids being opposite sides of the cube, and the apices of the pyramids intersecting substantially at the center of the cube.

22. An exchange column for exchanging heat and/or mass between a first phase and a second phase, the exchange column having at least one structured packing having a plurality of packing elements stacked together, wherein each packing element comprises:

a polyhedron having a plurality of edges formed by elongated rods; and at least one transfer sheet disposed within the polyhedron and having first and second ends, wherein the first end of each transfer sheet connects to a different edge of the polyhedron and the second end of each transfer sheet connects to another edge of the polyhedron.

23. An exchanger column as in claim 22 wherein the polyhedron is a cylinder.

24. An exchanger column as in claim 22 wherein the polyhedron is a parallelepiped.

25. An exchanger column as in claim 22 wherein the at least one transfer sheet has a surface texture on its surface.

26. An exchanger column as in claim 25 wherein the surface texture comprises a plurality of bands of fluting in the form of fine grooves which form alternating peaks and troughs across the surface of at least one transfer sheet.

27. An exchanger column as in claim 26 further including a plurality of apertures in the at least one transfer sheet.

28. An exchanger column as in claim 22 wherein the rods are substantially linear.

29. An exchanger column as in claim 22 wherein the rods are undulating.

30. An exchanger column as in claim 22 wherein the rods have a textured surface.

31. An exchanger column as in claim 22 further comprising connecting means for connecting adjacent packing elements.

32. An exchanger column as in claim 22 wherein the connecting means comprises:

at least one peg adjacent to at least one edge of a polyhedron of a packing element; and at least one aperture adjacent to at least one edge of a polyhedron of an adjacent packing element, said at least one aperture being sized to receive the at least one peg.

33. An exchanger column as in claim 22 wherein the connecting means further comprises at least one clip for clipping together adjacent packing elements.

34. An exchange column for exchanging heat and/or mass between a first phase and a second phase, the exchange column having at least one structured packing having a plurality of packing elements stacked together, wherein each packing element comprises:

a polyhedron having a plurality of edges formed by elongated rods; and a plurality of transfer sheets disposed with the polyhedron and having first and second ends, wherein the first end of each transfer sheet connects to a different edge of the polyhedron and the second end of each transfer sheet connects to another edge of the polyhedron.

35. An exchanger column as in claim 34 wherein at least some of the transfer sheets intersect.

36. An exchange column for exchanging heat and/or mass between a first phase and a second phase, the exchange column having at least one structured packing having a plurality of packing elements stacked together, wherein each packing element comprises:

a cube having a center and twelve edges comprising twelve elongated rods of equal length; and at least one transfer sheet disposed within the cube and having first and second ends, wherein the first end of each transfer sheet connects to a different edge of the cube and the second end of each transfer sheet connects to a diagonally opposite edge of the cube.

37. An exchanger column as in claim 36, wherein each of the at least one transfer sheets is narrower in width toward the center of the cube.

38. An exchange column for exchanging heat and/or mass between a first phase and a second phase, the exchange column having at least one structured packing having a plurality of packing elements stacked together, wherein each packing element comprises:

a cube having a center and twelve edges formed by twelve elongated rods of equal length; and a plurality of transfer sheets disposed within the cube, each transfer sheet having first and second ends, wherein the first end of each transfer sheet connects to a different edge of the cube and the second end of each transfer sheet connects to a diagonally opposite edge of the cube.

39. An exchanger column as in claim 38, wherein the transfer sheets intersect substantially at the center of the cube and each transfer sheet is progressively narrower in width toward the center of the cube.

40. An exchanger column as in claim 39, wherein each transfer sheet has a shape comprising two isosceles triangles, each triangle having a base and an apex, and the apices of the triangles intersect substantially at the center of the cube, and the bases of the triangles are diagonally opposite edges of the cube.

41. An exchanger column as in claim 40, wherein the intersection of the transfer sheets forms two pyramids, each pyramid having a square base and a plurality of sides which meet at an apex of the pyramid, the bases of the pyramids being opposite sides of the cube, and the apices of the pyramids intersecting substantially at the center of the cube.

42. An exchanger column as in claim 41, wherein one side of each pyramid is open and the other sides of the pyramids are formed by the intersecting transfer sheets.

43. A process for cryogenic air separation comprising contacting vapor and liquid countercurrently in at least one distillation column containing at least one mass transfer zone wherein liquid-vapor contact is established by at least one structured packing having a plurality of packing elements stacked together, wherein each packing element comprises:

a polyhedron having a plurality of edges formed by elongated rods; and at least one transfer sheet disposed within the polyhedron and having first and second ends, wherein the first end of each transfer sheet connects to a different edge of the polyhedron and the second end of each transfer sheet connects to another edge of the polyhedron.

44. A process for cryogenic air separation as in claim 43 wherein the polyhedron is a cylinder.

45. A process for cryogenic air separation as in claim 43 wherein the polyhedron is a parallelepiped.

46. A process for cryogenic air separation as in claim 43 wherein the at least one transfer sheet has a surface texture on its surface.

47. A process for cryogenic air separation as in claim 46 wherein the surface texture comprises a plurality of bands of fluting in the form of fine grooves which form alternating peaks and troughs across the surface of at least one transfer sheet.

48. A process for cryogenic air separation as in claim 47 further including a plurality of apertures in the at least one transfer sheet.

49. A process for cryogenic air separation as in claim 43 wherein the rods are substantially linear.

50. A process for cryogenic air separation as in claim 43 wherein the rods are undulating.

51. A process for cryogenic air separation as in claim 43 wherein the rods have a textured surface.

52. A process for cryogenic air separation as in claim 43 further comprising connecting means for connecting adjacent packing elements.

53. A process for cryogenic air separation as in claim 43 wherein the connecting means comprises:
    at least one peg adjacent to at least one edge of a polyhedron of a packing element; and
    at least one aperture adjacent to at least one edge of a polyhedron of an adjacent packing element, said at least one aperture being sized to receive the at least one peg.

54. A process for cryogenic air separation as in claim 43 wherein the connecting means further comprises at least one clip for clipping together adjacent packing elements.

55. A process for cryogenic air separation comprising contacting vapor and liquid countercurrently in at least one distillation column containing at least one mass transfer zone wherein liquid-vapor contact is established by at least one structured packing having a plurality of packing elements stacked together, wherein each packing element comprises:
    a polyhedron having a plurality of edges formed by elongated rods; and
    a plurality of transfer sheets disposed with the polyhedron and having first and second ends, wherein the first end of each transfer sheet connects to a different edge of the polyhedron and the second end of each transfer sheet connects to another edge of the polyhedron.

56. A process for cryogenic air separation as in claim 55 wherein at least some of the transfer sheets intersect.

57. A process for cryogenic air separation comprising contacting vapor and liquid countercurrently in at least one distillation column containing at least one mass transfer zone wherein liquid-vapor contact is established by at least one structured packing having a plurality of packing elements stacked together, wherein each packing element comprises:
    a cube having a center and twelve edges comprising twelve elongated rods of equal length; and
    at least one transfer sheet disposed within the cube and having first and second ends, wherein the first end of each transfer sheet connects to a different edge of the cube and the second end of each transfer sheet connects to a diagonally opposite edge of the cube.

58. A process for cryogenic air separation as in claim 57, wherein each of the at least one transfer sheets is narrower in width toward the center of the cube.

59. A process for cryogenic air separation comprising contacting vapor and liquid countercurrently in at least one distillation column containing at least one mass transfer zone wherein liquid-vapor contact is established by at least one structured packing having a plurality of packing elements stacked together, wherein each packing element comprises:
    a cube having a center and twelve edges formed by twelve elongated rods of equal length; and
    a plurality of transfer sheets disposed within the cube, each transfer sheet having first and second ends, wherein the first end of each transfer sheet connects to a different edge of the cube and the second end of each transfer sheet connects to a diagonally opposite edge of the cube.

60. A process for cryogenic air separation as in claim 59, wherein the transfer sheets intersect substantially at the center of the cube and each transfer sheet is progressively narrower in width toward the center of the cube.

61. A process for cryogenic air separation as in claim 60, wherein each transfer sheet has a shape comprising two isosceles triangles, each triangle having a base and an apex, and the apices of the triangles intersect substantially at the center of the cube, and the bases of the triangles are diagonally opposite edges of the cube.

62. A process for cryogenic air separation as in claim 61, wherein the intersection of the transfer sheets forms two pyramids, each pyramid having a square base and a plurality of sides which meet at an apex of the pyramid, the bases of the pyramids being opposite sides of the cube, and the apices of the pyramids intersecting substantially at the center of the cube.

63. A process for cryogenic air separation as in claim 62, wherein one side of each pyramid is open and the other sides of the pyramids are formed by the intersecting transfer sheets.

64. A process for exchanging mass and/or heat between two liquids, comprising contacting said liquids in at least one exchange column wherein liquid-liquid contact is established by at least one structured packing having a plurality of packing elements stacked together, wherein each packing element comprises:
    a polyhedron having a plurality of edges formed by elongated rods; and
    at least one transfer sheet disposed within the polyhedron and having first and second ends, wherein the first end of each transfer sheet connects to a different edge of the polyhedron and the second end of each transfer sheet connects to another edge of the polyhedron.

65. A process for exchanging mass and/or heat between two liquids as in claim 64 wherein the polyhedron is a cylinder.

66. A process for exchanging mass and/or heat between two liquids as in claim 64 wherein the polyhedron is a parallelepiped.

67. A process for exchanging mass and/or heat between two liquids as in claim 64 wherein the at least one transfer sheet has a surface texture on its surface.

68. A process for exchanging mass and/or heat between two liquids as in claim 67 wherein the surface texture comprises a plurality of bands of fluting in the form of fine grooves which form alternating peaks and troughs across the surface of at least one transfer sheet.

69. A process for exchanging mass and/or heat between two liquids as in claim 68 further including a plurality of apertures in the at least one transfer sheet.

70. A process for exchanging mass and/or heat between two liquids as in claim 64 wherein the rods are substantially linear.

71. A process for exchanging mass and/or heat between two liquids as in claim 64 wherein the rods are undulating.

72. A process for exchanging mass and/or heat between two liquids as in claim 64 wherein the rods have a textured surface.

73. A process for exchanging mass and/or heat between two liquids as in claim 64 further comprising connecting means for connecting adjacent packing elements.

74. A process for exchanging mass and/or heat between two liquids as in claim 64 wherein the connecting means comprises:

at least one peg adjacent to at least one edge of a polyhedron of a packing element; and     at least one aperture adjacent to at least one edge of a polyhedron of an adjacent packing element, said at least one aperture being sized to receive the at least one peg.

75. A process for exchanging mass and/or heat between two liquids as in claim 64 wherein the connecting means further comprises at least one clip for clipping together adjacent packing elements.

76. A process for exchanging mass and/or heat between two liquids, comprising contacting said liquids in at least one exchange column wherein liquid-liquid contact is established by at least one structured packing having a plurality of packing elements stacked together, wherein each packing element comprises:

a polyhedron having a plurality of edges formed by elongated rods; and     a plurality of transfer sheets disposed with the polyhedron and having first and second ends, wherein the first end of each transfer sheet connects to a different edge of the polyhedron and the second end of each transfer sheet connects to another edge of the polyhedron.

77. A process for exchanging mass and/or heat between two liquids as in claim 65 wherein at least some of the transfer sheets intersect.

78. A process for exchanging mass and/or heat between two liquids, comprising contacting said liquids in at least one exchange column wherein liquid-liquid contact is established by at least one structured packing having a plurality of packing elements stacked together, wherein each packing element comprises:

a cube having a center and twelve edges comprising twelve elongated rods of equal length; and     at least one transfer sheet disposed within the cube and having first and second ends, wherein the first end of each transfer sheet connects to a different edge of the cube and the second end of each transfer sheet connects to a diagonally opposite edge of the cube.

79. A process for exchanging mass and/or heat between two liquids as in claim 78, wherein each of the at least one transfer sheets is narrower in width toward the center of the cube.

80. A process for exchanging mass and/or heat between two liquids, comprising contacting said liquids in at least one exchange column wherein liquid-liquid contact is established by at least one structured packing having a plurality of packing elements stacked together, wherein each packing element comprises:

a cube having a center and twelve edges formed by twelve elongated rods of equal length; and     a plurality of transfer sheets disposed within the cube, each transfer sheet having first and second ends, wherein the first end of each transfer sheet connects to a different edge of the cube and the second end of each transfer sheet connects to a diagonally opposite edge of the cube.

81. A process for exchanging mass and/or heat between two liquids as in claim 80, wherein the transfer sheets intersect substantially at the center of the cube and each transfer sheet is progressively narrower in width toward the center of the cube.

82. A process for exchanging mass and/or heat between two liquids as in claim 81, wherein each transfer sheet has a shape comprising two isosceles triangles, each triangle having a base and an apex, and the apices of the triangles intersect substantially at the center of the cube, and the bases of the triangles are diagonally opposite edges of the cube.

83. A process for exchanging mass and/or heat between two liquids as in claim 82, wherein the intersection of the transfer sheets forms two pyramids, each pyramid having a square base and a plurality of sides which meet at an apex of the pyramid, the bases of the pyramids being opposite sides of the cube, and the apices of the pyramids intersecting substantially at the center of the cube.

84. A process for exchanging mass and/or heat between two liquids as in claim 83, wherein one side of each pyramid is open and the other sides of the pyramids are formed by the intersecting transfer sheets.

85. An exchange column for exchanging heat and/or mass between a first fluid and a second fluid, the exchange column comprising a plurality of substantially identical packing elements packed in layers of adjacent elements, each element containing at least one inclined flow surface over which two fluids may flow countercurrently to each other and an open portion through which fluid may flow, the elements being stackable such that the relative orientation of adjacent elements within a layer and between adjacent layers is freely determinable.

\* \* \* \* \*